US00RE42765E

(19) United States
(12) Reissued Patent
Andersen

(10) Patent Number: US RE42,765 E
(45) Date of Reissued Patent: Oct. 4, 2011

(54) PLANT FOR PRODUCING A FIBRE WEB OF PLASTIC AND CELLULOSE FIBRES

(75) Inventor: Jens Ole Bröchner Andersen, Skanderborg (DK)

(73) Assignee: Oerlikon Textile GmbH & Co. KG, Remscheid (DE)

(21) Appl. No.: 10/804,238

(22) PCT Filed: Oct. 12, 1998

(86) PCT No.: PCT/DK98/00443

§ 371 (c)(1),
(2), (4) Date: Apr. 12, 2000

(87) PCT Pub. No.: WO99/19551

PCT Pub. Date: Apr. 22, 1999

Related U.S. Patent Documents

Reissue of:
(64) Patent No.: 6,375,773
Issued: Apr. 23, 2002
Appl. No.: 09/529,362
Filed: Apr. 12, 2000

(30) Foreign Application Priority Data

Oct. 13, 1997 (DK) ..... 1166/97

(51) Int. Cl.
*D04H 1/48* (2006.01)

(52) U.S. Cl. ..... 28/104; 156/148; 156/62.2; 19/296; 442/408; 442/409; 264/121

(58) Field of Classification Search ..... 28/103, 28/104, 105, 106; 264/121, 122, 119, 6; 156/220, 167, 148, 42.2, 322; 19/296, 301; 442/408, 409, 410, 411
See application file for complete search history.

(56) References Cited

U.S. PATENT DOCUMENTS

| | | | | |
|---|---|---|---|---|
| 4,555,430 | A | 11/1985 | Mays | 428/134 |
| 4,661,132 | A | 4/1987 | Thornton et al. | 55/486 |
| 4,681,801 | A | 7/1987 | Eian et al. | 442/361 |
| 4,902,564 | A * | 2/1990 | Israel et al. | 28/104 |
| 4,931,355 | A | 6/1990 | Radwanski et al. | 442/344 |
| 4,997,607 | A | 3/1991 | Nopper et al. | 264/118 |
| 5,023,027 | A | 6/1991 | Nopper | 264/37.28 |

(Continued)

FOREIGN PATENT DOCUMENTS

| | | |
|---|---|---|
| EP | 0171 806 | 2/1986 |

(Continued)

*Primary Examiner* — Amy B Vanatta
(74) *Attorney, Agent, or Firm* — Winston & Strawn LLP

(57) ABSTRACT

A plant serves as a mean for production of a fibre web of synthetic fibres, such as plastic fibres and absorbent fibres, such as viscose and cellulose fibres. The plant includes a forming head preliminary to lay a homogeneously and smoothly distributed fibre layer on a net shaped wire. Furthermore the plant includes a hydro-entangling section with liquid nozzles with powerful liquid jets to treat the in the forming head formed fibre layer, which consists of both synthetic—and absorbent fibres. The plant also includes an oven subsequently to thermal bond the synthetic fibres with cross bonds in the affected areas. Finally the dried web is winded up in a roller. By the help of the plant according to the invention, by higher production speed than known previously a fibre web can be produced, which is far cheaper, and which has a better and more homogeneous structure than similar conventional fibre webs.

16 Claims, 4 Drawing Sheets

U.S. PATENT DOCUMENTS

| | | | | | |
|---|---|---|---|---|---|
| 5,240,764 | A | | 8/1993 | Haid et al. | 442/408 |
| 5,375,306 | A | | 12/1994 | Roussin-Moynier | 28/104 |
| 5,389,202 | A | * | 2/1995 | Everhart et al. | 28/104 |
| 5,396,689 | A | * | 3/1995 | Vuillaume | 28/103 |
| 5,500,281 | A | * | 3/1996 | Srinivasan et al. | 156/308.2 |
| 5,573,841 | A | | 11/1996 | Adam et al. | 428/219 |
| 5,617,618 | A | | 4/1997 | Fleissner | 28/103 |
| 6,007,653 | A | | 12/1999 | Pirinen et al. | 156/148 |
| 6,058,583 | A | | 5/2000 | Takeuchi et al. | 28/104 |
| 6,110,848 | A | | 8/2000 | Bouchette | 442/381 |
| 6,141,833 | A | | 11/2000 | Sorensen | 19/308 |
| 6,314,627 | B1 | * | 11/2001 | Ngai | 28/104 |
| 6,550,115 | B1 | * | 4/2003 | Skoog et al. | 28/104 |

FOREIGN PATENT DOCUMENTS

| | | |
|---|---|---|
| GB | 2319265 | 5/1998 |

* cited by examiner

PLANT FOR PRODUCING A FIBRE WEB OF PLASTIC AND CELLULOSE FIBRES

Matter enclosed in heavy brackets [ ] appears in the original patent but forms no part of this reissue specification; matter printed in italics indicates the additions made by reissue.

BACKGROUND ART

The invention concerns in any case synthetic fibres, such as plastic fibres and absorbent fibres, such as viscose and cellulose fibres to produce a fibre web, which at least include one heat-treatment section for heating up the synthetic fibres at least to one in advance determined temperature, and at least one hydro-entangling section with liquid nozzles to aim a number of powerful liquid jets against one made of synthetic fibres and absorbent fibres combined fibre layer.

A such plant is known, where long, carded, synthetic fibres of for instance polypropylene or polyethylene are laid in a web shaped layer on the top side of a net shaped, endless wire's upper tissue, which while running simultaneously runs in a direction, which points towards the plant's outlet. On the same or on a following wire the fibre layer hereafter is guided through an oven, where the fibres are heated up to such a high temperature that they will be tied together with cross bonds in the affected areas.

A thermal bonding fibre layer has now been formed, serving as a framework and supporting web for absorbent fibres, such as viscose and/or cellulose fibres, which as web can be un-winded from a roller or applied in an air-flow with the help of a known forming head.

A close-meshed wire transports hereafter the supporting web with the applicated fibres through a battery of water nozzles, which send a powerful water jets down against the fibres, which hereby are driven effectively into the underlying, frame-like supporting web.

When the water jets touch the close-meshed wire, part of the water is hit back against the supporting web, with the help of which the applicated fibres are wound around the cross bonded, synthetic fibres and are laid closely against the web's lower side, which hereby will be conveyed a smooth and flush surface.

The mentioned water exposure is in technical terms called hydro-entangling or spun-lacing. In the following the term hydro-entangling will be used.

The hydro-entangled web is dried in an oven, and finally the web is wound up in shape of a roller.

Fibre webs, which are manufactured in this way, are for instance used for products as wet wipes, towels, drapes, and gowns.

The above described process can be varied in several ways, which however has in common that they all start with a carded fibre layer. Typically the layers will be of polypropylene, polyethylene, or viscose, or a mixture of such fibres.

The carded made supporting web is soft and suitable for absorbing and intimately connect with the applicated fibres. In the longitudinal direction besides the web has such a matching strength that the process can proceed without a large risk of web breakage, which could lead to expensive stops of production and losses of materials.

Another advantage is that during the hydro-entangling process hydrogen bonds are made between the fibres, to avoid that the finished product flock and mote by use or processing.

The carding process however is slower than the following processes, which therefore cannot proceed with optimum capacity, this means the yield is reduced to a level, which is set by the carding process. Since plants of this kind are extremely expensive, it must be considered a serious lack that a great part of the known plant thus is not being used to the full extent.

Besides the carding process requiring close supervision and control, and it is difficult and complicated to work with, because for instance during running it is necessary to stretch the carded fibre layer.

The synthetic fibres, which make up the supporting web are furthermore considerably more expensive than cellulose fibres, and since the known process requires that approximately equal size quantities are being used of the two fibre types, the resulting product becomes expensive.

Even with the above mentioned content of synthetic fibres, the finished fibre web anyhow will suffer from the main lack that there exists an even big difference in the strength respectively in the longitudinal and transverse direction. The strength scale is typically 5:1. Products, which are manufactured of such fibre webs, therefore may tend to part alongside during use. Thus it is easy to stick a finger through the product.

A further disadvantage is that the known plant due to the carding process is rather unfit for production of sandwich webs, where the carded fibres become a part of several layers. The known plant can therefore not be used for production of one of today's strongly demanded products, which consists of two non-woven fibre layers with an intermediate air-laid fibre layer, which is tied together with the two others by the help of hydro-entangling layer, which is tied together with the two others by the help of hydro-entangling.

SUMMARY OF THE INVENTION

The purpose of the invention is to assign a plan t of at the opening mentioned character, which has a simple and cheap structure, which is easy to work with and financially favourable while running, and which furthermore can manufacture at a larger transition speed than known so far.

Another purpose of the invention consists of assigning a plant of at the opening mentioned character, by means of which a fibre web with a balanced proportion between the strengths respectively in the longitudinal and transverse direction can be manufactured.

A third purpose of the invention consists of assigning a plant of at the opening mentioned character, which is designed to manufacture fibre webs taking price and features into consideration for optimum proportions between the quantities of fibre types used for manufacturing the web.

A fourth purpose of the invention consists of assigning a plant of at the opening mentioned character, by means of which a fibre web can be manufactured, which has a more homogeneous and precise distribution of fibres than formerly known.

A fifth purpose of the invention consists of assigning a plant of at the opening mentioned character, by means of which a fibre web with tighter tolerances than formerly known can be manufactured.

A sixth purpose of the invention consists of assigning a plant of at the opening mentioned character, by means of which a sandwich fibre web easily can be manufactured.

The new and specific, by means of which this is achieved according to the invention consist of the plant besides include an air-laying section including means during operation to generate a mainly vertical descending air-flow through at any rate the upper tissue on a mainly vertical running net shaped, endless wire, and successively supply the air-flow with at least synthetic fibres and distribute these in a smooth and homogenous, web shaped layer on the upper side of the wire's upper tissue, which under here runs in one against the plant's outlet pointing direction.

When the known plant's carding process thus is replaced by a reliable and financially favourable air-laying process the plant's remaining equipment is now made able to operate at optimum production speed, simultaneously the process becomes easy to control. The fibres can be distributed homogeneously and precisely with an equal orientation in all directions, thus the finished fibre web achieves approximately same strength in longitudinal and transverse direction, and besides manufacturing with tight tolerances becomes possible.

Now the process does not require a large strength in the longitudinal direction anymore, and the expensive synthetic fibres can among other things for this reason to a large extent be replaced by cheaper cellulose fibres, by means of which the finished fibre web's absorbent features are improved favourably, and the cost price is being reduced.

It is especially favourable, when the absorbent fibres are added at the same time as the synthetic fibres in the same air-laying section, since the fibres hereby are mixed intimately from start, and the supporting web will be integrated in the forming process.

For the purpose a forming head can be used, which include a under the wire's upper tissue placed suction box, which is connected t o a vacuum air pump, one above the wire placed house with one or more fibre inlets, and one in the house above the wire placed number of rotary wings for while operating to distribute the fibres in a flush layer on the upper side of the wire's upper tissue.

A simple and cheap construction form for the plant can be constructed of a forming head for at a time to form both the synthetic fibres and the absorbent fibres, a hydro-entangling section, and an oven with sufficient high treatment-temperature to thermal bond the synthetic fibres in the affected areas.

By this construction the thermal bonding of the synthetic fibres takes place in the same oven, which is used for drying the hydro-entangled fibre web. When a specific thermal bonding oven is inserted between the forming head and the hydro-entangling section, the process can be controlled very precisely, because the temperatures in respectively the thermal bonding oven and the later drying oven can be adjusted to an optimum for the respective processes. Furthermore the fibre web is now stabilised, when it passes through the hydro-entangling process, which therefore can proceed with an optimum effect and without a large waste of loose fibres.

When the single forming head in one of the two above mentioned construction forms for the plant according to the invention is replaced with three on one-and-another following forming heads, the plant can be successfully used for production of sandwich fibre webs, since the middle forming head then mainly is supplied with for instance cellulose fibres, while the two other forming heads are supplied with synthetic fibres or both synthetic fibres and cellulose fibres.

BRIEF DESCRIPTION OF THE DRAWINGS

The invention regards also a fibre web, which is manufactured by the help of the above mentioned plant according to the invention, and which contains synthetic fibres as well as absorbent fibres. Due to the production process this web has a structure with a homogenous orientation of the fibres in all directions and a good balance between the strengths respectively in longitudinal and transverse direction.

An effectively tied and therefore strong fibre web is achieved, when the synthetic fibres are bi-component fibres, which each consists of a core of at first plastic and then of another one of plastic with a higher melting point than the first. When this form of synthetic fibres are being used, bonding is secured in all places, where the fibres meet, without a simultaneous risk of the core to melt, by which the bonding feature would be lost.

With the help of the plant according to the invention manufactured fibre web can favourably have a percentage content of cellulose fibres of between 50 and 95, mainly between 60 and 90, and especially between 75 and 85, at which the web becomes substantially cheaper than the conventional fibre webs of this type.

BRIEF DESCRIPTION OF THE DRAWINGS

Figure 1:
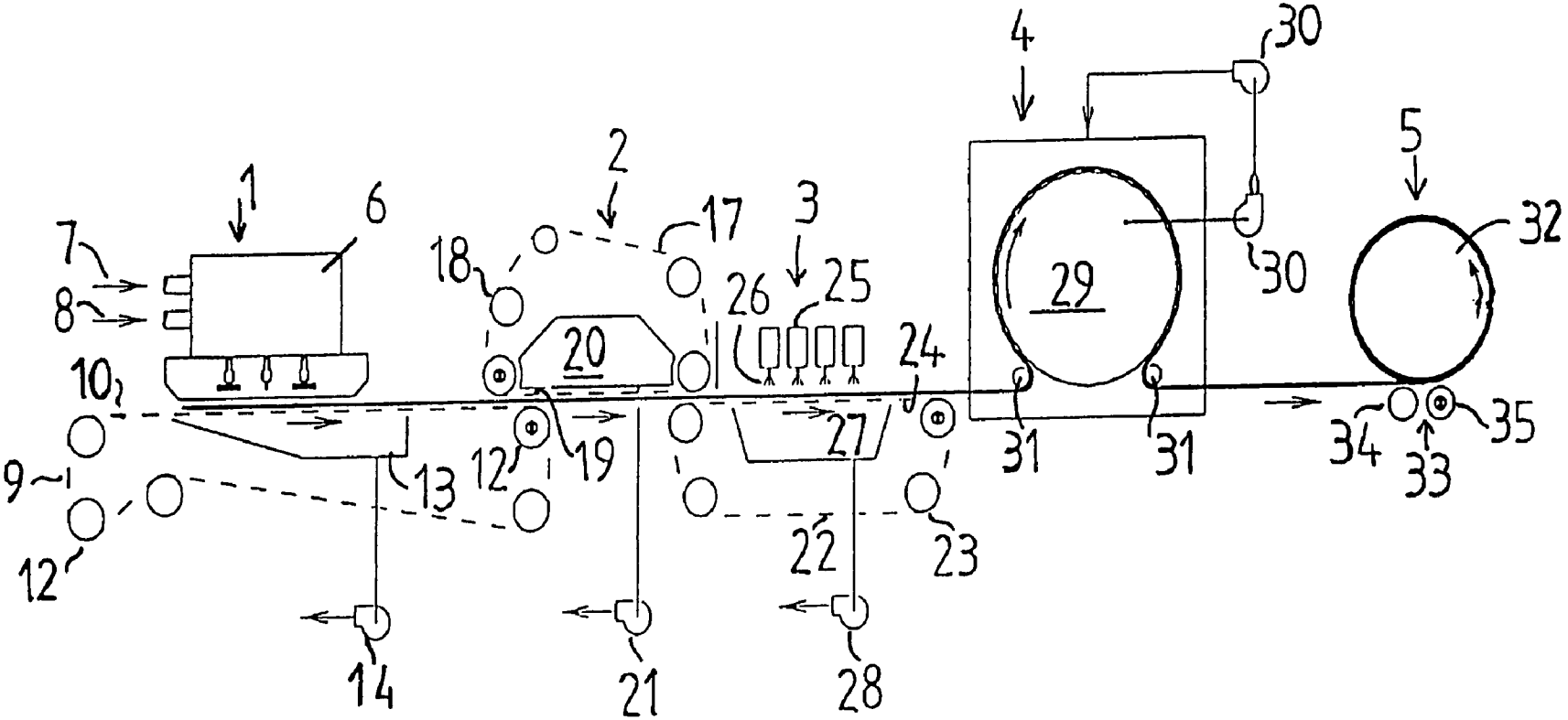
Figure 2:
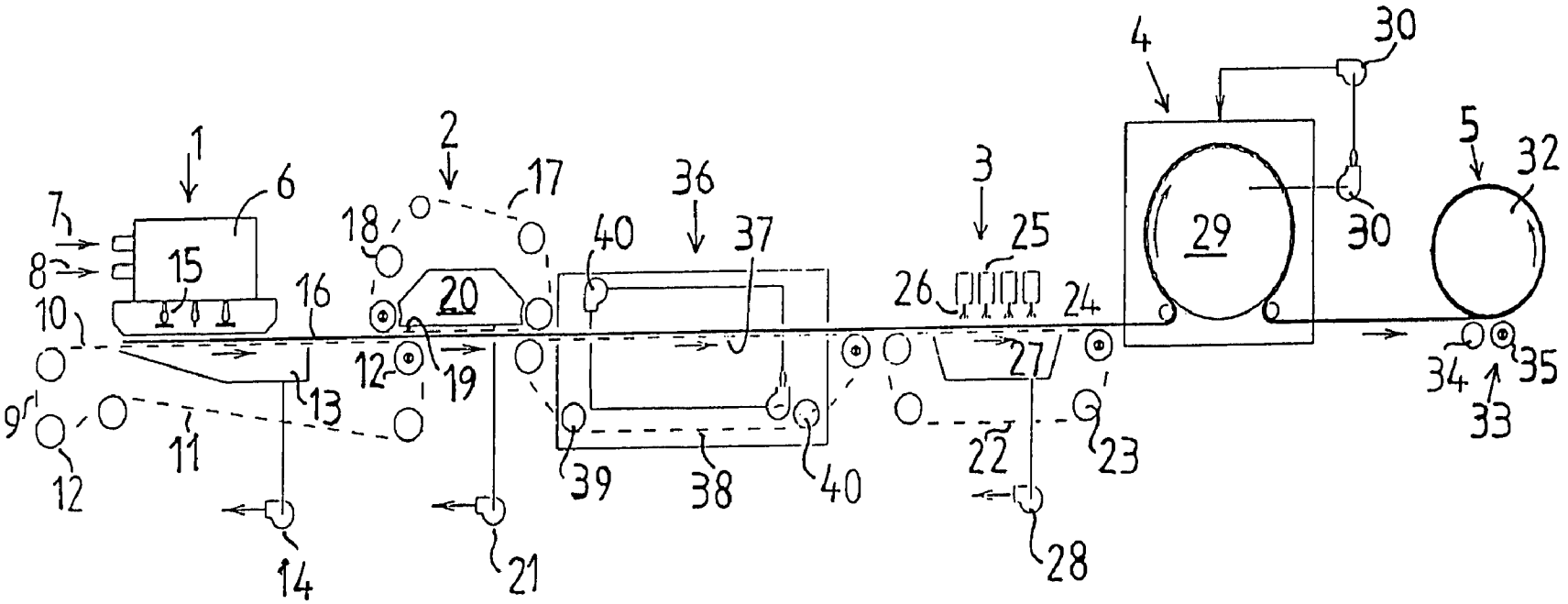

FIG. 1 shows schematically a first construction form for a plant according to the invention FIG. 2 shows schematically a second construction form for a plant according to the invention.

Figure 3:
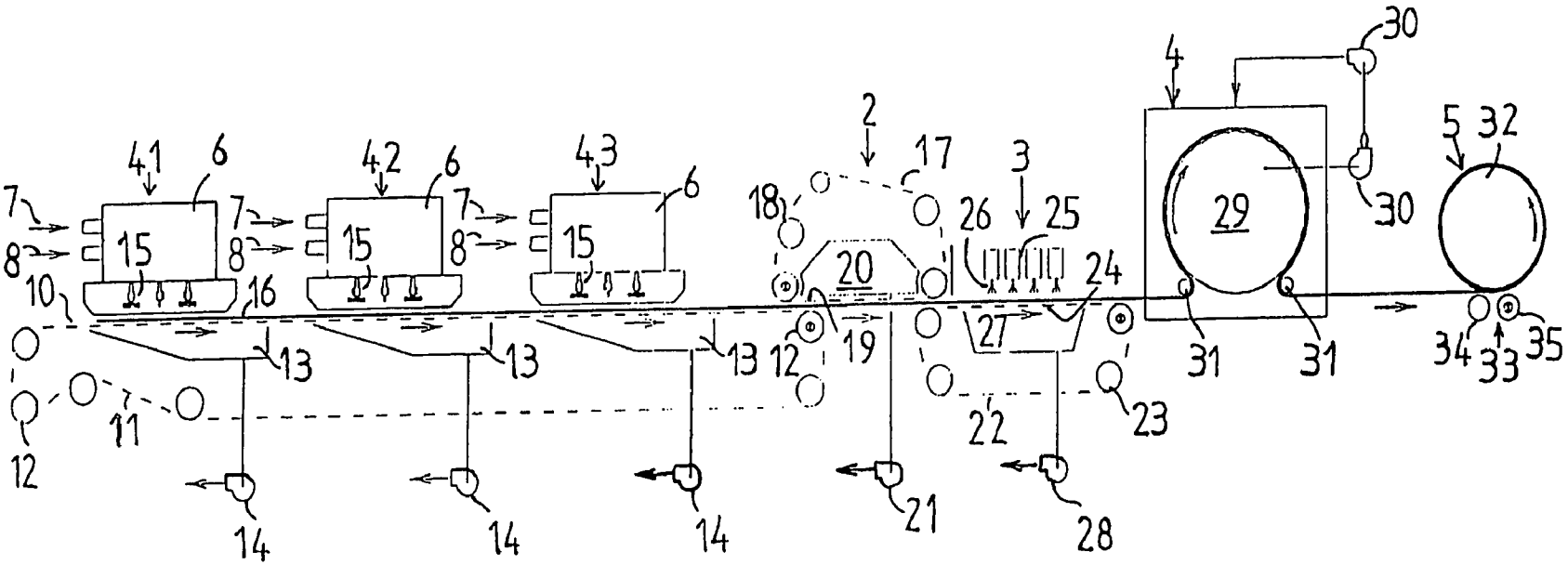
Figure 4:
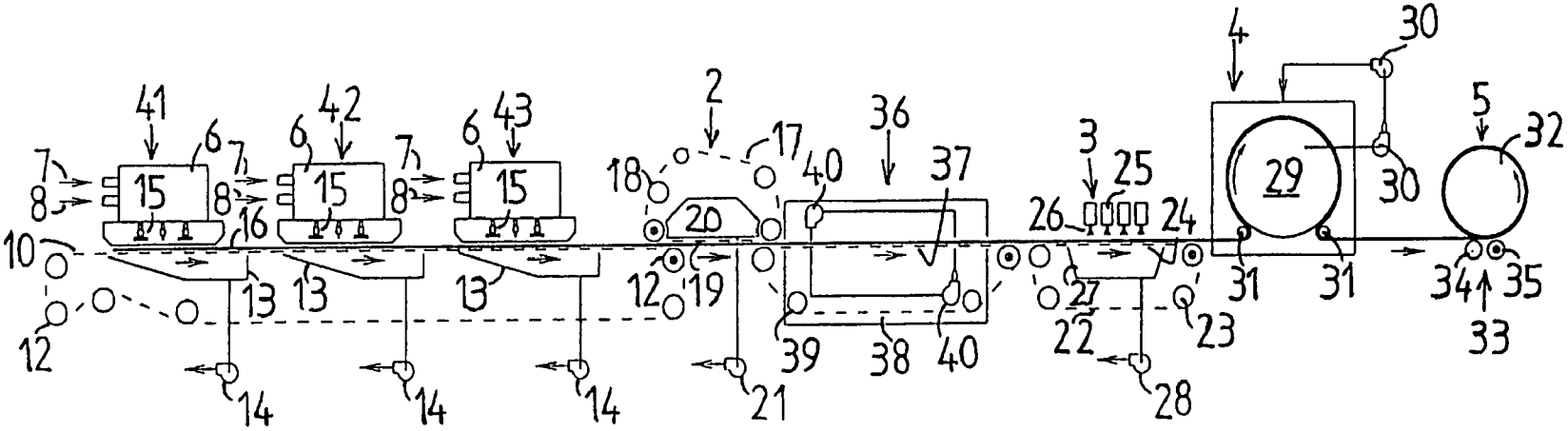

FIG. 3 shows schematically a third construction form for a plant according to the invention, and FIG. 4 shows schematically a fourth construction form for a plant according to the invention.

DETAILED DESCRIPTION OF PREFERRED EMBODIMENTS

In FIG. 1 a first construction form for a plant according to the invention can be seen. The main components are a forming head 1, a conveyor 2, a hydro-entangling section 3, an oven 4, and a winder section 5.

The forming head 1 consists of a house 6 with a fibre inlet 7 for synthetic fibres, for instance plastic fibres, and a fibre. inlet 8 for instance cellulose fibres Below the house a net shaped wire 9, having an upper tissue 10 and a lower tissue 11 runs above roller 12.

Close under the wire's upper tissue 10 a suction box 13 is placed, which is connected to a vacuum pump 14, and above the wire's upper tissue 10 a number of rotating wings 15 are placed.

During operation the vacuum pump 14 provides via the suction box 13 and the house 6 an air-flow, which from an unshown source for synthetic fibres and likewise an un-shown source for absorbent fibres, as for instance cellulose fibres, leads synthetic fibres and absorbent fibres into the house 6 via respectively the fibre inlet 7 and the fibre inlet 8.

The air-flow flows down through the wire's upper tissue 10, while the fibres are kept back on the tissue's upper side, where those are mixed and distributed by the rotating wings 15 in an flush and homogeneous fibre layer 16 with a random and even orientation of the fibres in all directions.

Simultaneously the wire runs 9's upper tissue 10 in the arrow shown direction against the plant's outlet at the winder section 5, and delivers under here the fibre web 16 to the conveyor 2.

This conveyor 2 consists of a wire 17, which overlaps the forming head's wire 9 and runs over rollers 18. The wire 17 has a lower tissue, which is placed on the upper side of the fibre layer 16.

The suction box 20, which is connected to a vacuum air pump 21 and is placed above the wire 17's lower tissue, generates a negative pressure, which holds the fibre layer 16 on to the wire 17's lower tissue 19, which thereby will be able to transport the fibre layer 16 to the hydro-entangling section 3 in the with the arrow shown direction.

This hydro-entangling section 3 consists of a relatively close-meshed wire 22, which overlaps the wire 17 of the conveyor 2 and runs above rollers 23. The wire 22 has an upper tissue 24, which is placed on the lower side of the fibre layer 16.

A number of water nozzles 25 are placed above upper tissue 24 of the wire 22, sending powerful water jets 26 down against the fibre layer 16, which are held to the web by an underlying suction box 27, which is connected to a vacuum air pump 28. Water and loose fibres will be removed from the suction box 27 by the pump 28.

The water jets wind the fibre web's different fibres together in a strong bond. A portion of the water fights at the meeting with the close-meshed wire 22's upper tissue 24 besides back against the fibre web's lower side, supplying a flush and smooth surface.

Furthermore the hydro-entangling treatment effects that between the fibres, hydrogen bonds will be formed, which prevent flocculation and dust by use and during processing.

After the hydro-entangling treatment, the now relatively strong and well coherent fibre web runs into an oven 4, which works at a sufficient high temperature to thermal bond the synthetic fibres in the affected area. Simultaneously the web will be dried.

In the oven 4 a rotating roll 29 is equipped with a perforated wall, which allows a warm flow of air to pass. The air-flow will be re-circulated as shown by the help of fans 30.

During the passage of the oven 4 the fibre web 16 runs around rollers 31 and the in arrow pointing direction rotating roll 29, by means of which the warm air will be forced through the fibre web, which dries, simultaneously a cross bond in the contact points will be formed mutually between the synthetic fibres and to a certain extent also between the synthetic fibres and the absorbent fibres.

Finally the finished fibre web will be wound up into a roller of fibre web 32 in the roller section 5, which fundamentally consists of a winder 33 with a driven roller 34 and an idler roller 35.

FIG. 2 shows other construction form for a plant according to the invention and separates itself from the above described and shown in FIG. 1 first construction form by, a special thermal bonding oven 36 being inserted between the conveyor 2 and the hydro-entangling section 3. Similar parts are therefore indicated with the same reference numbers.

The thermal bonding oven 36 is a continuos oven, which the upper tissue 37 passes through on a wire 38, which runs above roller 39. The fans 40 serve the purpose of re-circulating the air across through the fibre web 16 and the upper tissue 37 of the wire 38, which carries the fibre web.

The thermal bonding oven 40 works with a temperature, which is sufficiently high to bond the synthetic fibres together in the affected areas, however not that high that the fibres melt noticeably.

The process in the thermal bonding oven is easiest controlled, when bi-component fibres are used. When the core for example has a melting point of 180 Celsius and the shell a melting point of for example 135 Celsius, the temperature in the oven must be kept in a spot between these two temperatures to efficiently cross bond the synthetic fibres in the affected areas without risking the core to melt simultaneously.

One of the advantages, which is obtained by using this special thermal bonding oven 36, consists of the fibre web 16 is stabilised in advance, thus the following hydro-entangling process can proceed with increased certainty and less fibre waste, which must be lead away in the wastewater.

Another advantage consists of the oven 4, now just needs to work as a drying oven, and therefore can work with a here fore fitted lower temperature, which size furthermore is uncritical.

FIG. 3 shows third construction form for a plant according to the invention and separates itself from the above described and shown in FIG. 1 first construction form by, instead of only one forming head three exists placed after one-another 41, 42, and 43. Each of these forming heads are constructed in the same way as the first constructions form's forming head 1. Similar parts are therefore indicated with the same reference numbers.

When the plant in this way is supplied with three forming heads, it can be used for production of sandwich-fibre web, which typically consist of a soft thermal bonded top- and bottom layer with an absorbent core. The sandwich-fibre web can for example have following combination.

EXAMPLE 1

Bottom layer 15 GSM

The proportions between the synthetic fibres and the absorbent fibres, such as cellulose fibres 10-5. This means that 67% of the bottom layer consists of synthetic fibres and 33% of absorbent fibres.

Middle layer 30 GSM

The proportions between the synthetic fibres and the absorbent fibres, such as cellulose fibres 3-27. This means that 10% of the middle layer consists of synthetic fibres and 90% of absorbent fibres.

Top layer 15 GSM

The proportions between the synthetic fibres and the absorbent fibres, such as cellulose fibres 7-8. This means that 47% of the top layer consists of synthetic fibres and 53% of absorbent fibres.

The process processes in a way that the first forming bead 41 will be supplied with the fibres for the bottom layer, the other forming head 42 with the fibres for the middle layer, and the third forming head 43 with the fibres for the top layer, thus the three layers will be formed in each layer's separate forming head 41, 42, 43 and successively will be laid on top of one-another. Subsequently the process continues in the same way as described for the first construction form.

The in FIG. 3 shown fourth construction form for a plant according to the invention separates itself from the above mentioned and in FIG. 3 shown third construction form by, now similar to the other construction form, and as shown in FIG. 2, a special continuous thermal bonding oven 36 is inserted between the conveyor and the hydro-entangling section 3. Similar parts are therefore also in this case indicated with the same reference numbers.

With this setting of the plant according to the fourth construction form the same advantages will be achieved as described in connection with the description of the other construction form.

In the below table indicated data respectively for a card based product and a product according to the invention serves the purpose of making the advantages clear, which can be achieved by the invention.

EXAMPLE 2

| Product features | Card based product | Product according to the invention |
|---|---|---|
| Content of thermal bonding fibres | 50% | 5%-45% |
| Content of cellulose fibres | 50% | 95%-55% |
| Length of thermal bonding fibres | 12-60 mm | 2-25 mm |
| Length of viscose fibres | 6-60 mm | |
| Length of cellulose fibres | 0-6 mm | 0-6 mm |
| Length of alternative fibres (for example absorbent fibres) | | 2-25 mm |
| Dry strength, longitudinal direction | 100 N/50 mm *) | 25-50 N/50 mm *) |
| Dry strength, transverse direction | 20 N/50 mm *) | 15-30 N/50 mm *) |
| Wet strength, longitudinal direction | 100 N/50 mm *) | 19 N/50 mm *) |
| Wet strength, transverse direction | 20 N/50 mm *) | 11 N/50 mm *) |
| *) gram weight | 65 g/sqm | 65 g/sqm |

As it can be seen, a great part of the expensive synthetic fibres in the conventional card based product has been replaced by cheaper cellulose fibres in the inventive product, which in this way can manufacture at a far lower price than the conventional product.

Simultaneously the inventive product's strength is favourable fairly identical in the longitudinal and transverse direction, while the conventional product's corresponding strength ratio is as 5-1.

It must be noted that the above described and on the drawing shown constructions forms only serve as considerate examples of, how a plant according to the invention can be arranged.

In this way the plant can, within the frame of the invention's protection scale after need be supplied with two, four, or a bigger number of forming heads, which besides do not necessarily need to be placed in a row just after one-another.

Furthermore in the production line one or several further sections can be inserted to in dependency of the wished quality to treat the fibre web.

What is claimed is:

1. A plant for producing a nonwoven fabric at least of synthetic fibres comprising:

at least one air-laying station comprising:

an endless wire, a suction box, which is connected to a vacuum pump, said suction box being placed under said endless wire, a house with one or more fibre inlets, said house being placed above the upper part of said endless wire, a number of rotatably arranged wings for during operation distributing the fibres in a non-woven web upon the upper part of said endless wire, said wings being placed above said endless wire in said house, at least one heat-treatment station for bonding the synthetic fibres by heating the web, said heat-treatment station being arranged downstream of said at least one air-laying station, at least one hydro-entangling station for directing a number of powerful liquid jets against the bonded web, said hydro-entangling station being arranged downstream of said at least one heat-treatment station, and means for continuous transport of the web through the plant.

2. A plant according to claim 1 wherein at least one drying station for drying the hydro-entangled nonwoven web is arranged downstream of the hydro-entangling station.

3. A plant according to claim 2 wherein the drying station is adapted to act upon the hydro-entangled nonwoven web with temperature sufficient to further bond the synthetic fibres.

4. A plant according to claim 2 wherein the drying station comprises a rotatable drum which has a perforated wall for during operation supporting a length of the hydroentangled nonwoven web and simultaneously allowing a stream of air to pass.

5. A plant according to claim 1 wherein the plant comprises at least three in succession arranged airlaying stations.

6. A nonwoven fabric *in the form of a three-layered hydro-entangled sandwich fibre web* comprising at least synthetic fibres *and cellulosic fibres* produced in a plant comprising:

at least one air-laying station comprising:

an endless wire, a suction box, which is connected to a vacuum pump, said suction box being placed under said endless wire,

*first, second, and third air-laying forming heads each comprising* a house with one or more fibre inlets, said house being placed above the upper part of said endless wire[.] *and* a number of rotatably arranged wings for during operation disbributing the fibres in a non-woven web upon the upper part of said endless wire, said wings being placed above said endless wire in said house, at least one beat-treatment station for bonding the synthetic fibres by heating the web, said heat-treatment station being arranged downstream of said at least one air-laying station, at least one hydro-entangling station for directing a number of powerful liquid jets against the bonded web, said hydro-entangling station being arranged downstream of said at least one heat-treatment station, and means for continuous transport of the web through the plant,

*wherein the non-woven fabric is produced by:*

*supplying synthetic fibres to the first forming head for forming a layer of the web;*

*supplying cellulose fibres to the second forming head for forming another layer of the web;*

*supplying synthetic fibres to the third forming head for forming another layer of the web;*

*successively laying the layers on top of one another whereby a three-layered sandwich fibre web is formed;*

*hydro-entangling the thus formed web for forming a strong bond between the fibres in the layers of the web; and*

*heating the web at the heat-treatment station for bonding the synthetic fibres and drying the web.*

7. A nonwoven fabric according to claim 6 wherein at least part of the synthetic fibres are bi-component fibres, which each consists of a core of a first plastic surrounded by a second plastic having a [higher] *lower* melting point than the first plastic.

8. A nonwoven fabric according to claim 6 wherein the fabric comprises cellulose fibres present in an amount of between 50% and 95%, *wherein the cellulose fibres are provided in the web by forming a separate layer of the cellulose*

*fibres and associating the layer of cellulose fibres with the layer of synthetic fibres prior to hydro-entangling and heating of the web.*

9. A nonwoven fabric according to claim [6] *8* wherein the fabric comprises cellulose fibres present in an amount of between 60% and 90%.

10. A nonwoven fabric according to claim [6] *8* wherein the fabric comprises cellulose fibres present in an amount of between 75% and 85%.

*11. A nonwoven fabric according to claim 6 wherein the three-layered hydro-entangled sandwich fibre web comprises top, bottom and middle layers, with the top and bottom layers comprising the synthetic fibres and the middle layer comprising the cellulose fibres.*

*12. A plant according to claim 1, wherein the plant is used for production of a three-layered sandwich-fibre web.*

*13. A process for forming a three-layered hydro-entangled sandwich fibre web, said process comprising:*

*supplying to a first air-laying forming head fibres for the bottom layer, said fibres comprising at least synthetic fibres;*

*supplying to a second air-laying forming head fibres for the middle layer, said fibres comprising at least cellulose fibres;*

*supplying to a third air-laying forming head fibres for the top layer, said fibres comprising at least synthetic fibres;*

*forming the three layers in the each layer's separate forming head;*

*successively laying the layers on top of one another whereby a three-layered sandwich fibre web is formed;*

*hydro-entangling the thus formed web for forming a strong bond between the fibres in the web; and*

*heating the web for bonding the synthetic fibres and drying the web.*

*14. A nonwoven fabric comprising the three-layered hydro-entangled sandwich fibre web produced by the process of claim 13.*

*15. A nonwoven fabric according to claim 14 wherein the web comprises at least synthetic fibres and cellulosic fibres wherein at least part of the synthetic fibres are bi-component fibres, which each consists of a core of a first plastic surrounded by a second plastic having a lower melting point than the first plastic.*

*16. A nonwoven fabric according to claim 15 wherein the fabric comprises cellulose fibres present in an amount of between 50% and 95%, wherein the cellulose fibres are provided in the web by forming a separate layer of the cellulose fibres and associating the layer of cellulose fibres with the layer of synthetic fibres prior to hydro-entangling and heating of the web.*

* * * * *

UNITED STATES PATENT AND TRADEMARK OFFICE

CERTIFICATE OF CORRECTION

PATENT NO. : RE42,765 E
APPLICATION NO. : 10/804238
DATED : October 4, 2011
INVENTOR(S) : Andersen It is certified that error appears in the above-identified patent and that said Letters Patent is hereby corrected as shown below:

Column 8:
Line 31 (claim 6, line 12), change "disbributing" to -- distributing --.
Line 34 (claim 6, line 15), change "beat-treatment" to -- heat-treatment --.

Signed and Sealed this
Fifteenth Day of November, 2011

David J. Kappos

David J. Kappos
*Director of the United States Patent and Trademark Office*